US011230315B2

(12) United States Patent
Kastelic et al.

(10) Patent No.: US 11,230,315 B2
(45) Date of Patent: Jan. 25, 2022

(54) FOLDABLE STEERING WHEEL

(71) Applicant: JOYSON SAFETY SYSTEMS ACQUISITION LLC, Auburn Hills, MI (US)

(72) Inventors: Kurt Kastelic, Rochester, MI (US); Karl Kiefer, Shelby Township, MI (US); Adorian Marc, Troy, MI (US); Erick Staszak, Clarkston, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 0 days.

(21) Appl. No.: 17/156,900

(22) Filed: Jan. 25, 2021

(65) Prior Publication Data

US 2021/0229732 A1    Jul. 29, 2021

Related U.S. Application Data

(60) Provisional application No. 62/965,642, filed on Jan. 24, 2020.

(51) Int. Cl.
*B62D 1/04* (2006.01)
*B62D 1/10* (2006.01)
*B62D 1/08* (2006.01)

(52) U.S. Cl.
CPC ........ *B62D 1/10* (2013.01); *B62D 1/08* (2013.01)

(58) Field of Classification Search
CPC .. G05G 1/04; G05G 1/06; G05G 1/08; G05G 1/10; G05G 1/11; G05G 1/183; B62D 1/04; B62D 1/06; B62D 1/08; B62D 1/10; B62D 1/11; B62D 1/183
See application file for complete search history.

(56) References Cited

U.S. PATENT DOCUMENTS

| 1,002,663 | A | * | 9/1911 | Fest, Jr. | ............... B62D 1/10 74/555 |
| 1,098,301 | A | * | 5/1914 | Prindle | ................ B62D 1/10 74/555 |

(Continued)

FOREIGN PATENT DOCUMENTS

| CH | 711640 A2 | * | 4/2017 | ......... B64C 13/0423 |
| DE | 19856940 C1 | * | 7/2000 | ............. C22F 1/047 |

(Continued)

OTHER PUBLICATIONS

Machine translation of DE 19856940 C1 obtained on Jun. 9, 2021.*
International Search Report and Written Opinion issued for Application No. PCT/US2021/014845, dated May 21, 2021.

*Primary Examiner* — Adam D Rogers
(74) *Attorney, Agent, or Firm* — Meunier Carlin & Curfman LLC

(57) ABSTRACT

Various implementations include a steering wheel assembly. The assembly includes a hub, a steering grip, and a hinging mechanism. The hub is configured to be rotatably coupled to a steering column such that the hub is rotatable about a central axis of the steering column. The steering grip has one or more spokes. The hinging mechanism couples the one or more spokes to the hub such that the steering grip is rotatable relative to the hub about a rotational axis from a first position to a second position. The rotational axis is perpendicular to the central axis of the steering column.

15 Claims, 14 Drawing Sheets

(56) References Cited

U.S. PATENT DOCUMENTS

| | | | | |
|---|---|---|---|---|
| 1,171,224 A | * | 2/1916 | Means | B62D 1/10 74/555 |
| 1,276,797 A | * | 8/1918 | Newton | B62D 1/10 74/555 |
| 1,303,928 A | * | 5/1919 | Lougheed | B62D 1/10 74/555 |
| 1,374,830 A | * | 4/1921 | Davis | B62D 1/10 74/555 |
| 1,414,405 A | * | 5/1922 | Gossett | B62D 1/10 70/209 |
| 1,457,722 A | * | 6/1923 | Busby | B60R 25/0224 70/209 |
| 1,459,040 A | * | 6/1923 | Vincent | B62D 1/10 74/556 |
| 1,487,638 A | * | 3/1924 | Williams | B62D 1/08 74/555 |
| 1,528,965 A | * | 3/1925 | Bauer | B62D 1/10 74/555 |
| 1,542,949 A | * | 6/1925 | Michaud | B62D 1/10 74/555 |
| 1,543,047 A | * | 6/1925 | Behrsing | B62D 1/10 74/555 |
| 1,677,616 A | * | 7/1928 | Bronson | B62D 1/10 74/555 |
| 1,847,209 A | * | 3/1932 | Bolinas, Jr. | B60R 25/0224 74/555 |
| 2,335,966 A | * | 12/1943 | Roos | B62D 1/10 74/555 |
| 2,813,436 A | * | 11/1957 | Barenyi | B62D 1/04 74/555 |
| 10,562,558 B1 | * | 2/2020 | Spahn | B62D 1/04 |
| 2007/0290494 A1 | | 12/2007 | Ichikawa | |
| 2007/0295151 A1 | | 12/2007 | Kentor | |
| 2018/0079441 A1 | | 3/2018 | Mckinzie | |
| 2018/0154921 A1 | | 6/2018 | Bonello et al. | |
| 2019/0308655 A1 | * | 10/2019 | Ochi | B60K 37/02 |
| 2020/0198684 A1 | * | 6/2020 | Murray | B62D 1/06 |
| 2021/0016820 A1 | * | 1/2021 | Nozawa | B62D 1/181 |

FOREIGN PATENT DOCUMENTS

| | | | | |
|---|---|---|---|---|
| DE | 102016015254 A1 | * | 5/2017 | B62D 1/06 |
| DE | 102017223111 A1 | * | 6/2019 | B62D 1/183 |
| DE | 102019102068 A1 | * | 7/2020 | B62D 1/10 |
| DE | 102019106334 A1 | * | 9/2020 | B60N 3/005 |
| DE | 102019205950 A1 | * | 10/2020 | B62D 1/06 |
| FR | 574704 A | * | 7/1924 | B62D 1/10 |
| FR | 2806042 A1 | * | 9/2001 | B60K 37/00 |
| KR | 10-1856524 B1 | | 5/2018 | |
| WO | WO-03020571 A1 | * | 3/2003 | B62D 1/181 |
| WO | 2019193956 A1 | | 10/2019 | |

* cited by examiner

FOLDABLE STEERING WHEEL

CROSS-REFERENCE TO RELATED APPLICATIONS

This application claims the benefit of U.S. Provisional Patent Application No. 62/965,642, filed Jan. 24, 2020, the contents of which are incorporated herein by reference in their entirety.

BACKGROUND

Drivers who spend long periods of time in a vehicle often use their vehicles for uses other than driving (e.g., eat a meal or use a laptop computer). When the driver is in the driver's seat and the vehicle is stopped, the driver can be encumbered by the steering wheel in their lap while trying to perform these other tasks.

Thus, there is a desire for a steering wheel assembly capable of being moved from the normal driving position.

SUMMARY

Various implementations include a steering wheel assembly. The assembly includes a hub, a steering grip, spokes extending between the hub and the steering grip, and a hinging mechanism. The hub is configured to be rotatably coupled to a steering column such that the hub is rotatable about a central axis of the steering column. The steering grip has one or more spokes. The hinging mechanism couples the one or more spokes to the hub such that the steering grip and spokes are rotatable relative to the hub about a rotational axis from a first position to a second position. The rotational axis is perpendicular to the central axis of the steering column.

In some implementations, the hinging mechanism includes a first portion and a second portion rotatable relative to the first portion about the rotational axis. The first portion is fixedly coupled to the hub and the second portion is fixedly coupled to the spoke.

In some implementations, the hinging mechanism includes at least two bumpers made of a resilient material. A first of the at least two bumpers is positioned such that the second portion of the hinging mechanism abuts and compresses the first bumper when the steering grip is in the first position, and a second of the at least two bumpers is positioned such that the second portion of the hinging mechanism abuts and compresses the second bumper when the steering grip is in the second position.

In some implementations, the hinging mechanism includes a locking mechanism actuatable between an engaged position and a disengaged position. The locking mechanism prevents the steering grip from rotating relative to the hub when the locking mechanism is in the engaged position.

In some implementations, the locking mechanism includes one or more openings defined by either the first portion or the second portion, and a protrusion removably engageable with one of the openings to prevent the steering grip from rotating when the locking mechanism is in the engaged position.

In some implementations, each of the one or more openings is a v-shaped groove, and the protrusion is a v-shaped protrusion.

In some implementations, the portion of the locking mechanism defining the one or more openings, the protrusion, or both comprise heat treated metal.

In some implementations, the one or more openings include a first opening and a second opening. The steering grip is in the first position when the protrusion is engaged with the first opening, and the steering grip is in the second position when the protrusion is engaged with the second opening.

In some implementations, the locking mechanism includes three or more openings and the steering grip is in a different position relative to the hub when the protrusion is engaged with each of the three or more openings.

In some implementations, the locking mechanism includes one or more locking solenoids actuatable between a retracted position and an extended position. The locking solenoid prevents the locking mechanism from actuating from the engaged position to the disengaged position when the locking solenoid is in the extended position.

In some implementations, the locking solenoid includes a sensor for detecting whether the rod has fully extended to the extended position.

In some implementations, the assembly further includes a control pad having an activation button for actuating the locking solenoid from the extended position to the retracted position.

In some implementations, the locking mechanism includes a handlebar and the protrusion extends from the handlebar. The handlebar is rotatable to actuate the locking mechanism from the engaged position to the disengaged position.

In some implementations, the locking mechanism includes a spring configured to bias the handlebar toward the engaged position.

In some implementations, the hub includes at least two spring arm retention protrusions, and an end portion of the spring is disposed between the at least two spring arm retention protrusions.

In some implementations, the assembly further includes a motor for moving the steering grip from the first position to the second position.

In some implementations, the assembly further includes one or more positional sensors for determining a rotation position of the steering grip about the rotational axis.

In some implementations, the hinging mechanism includes a first portion and a second portion rotatable relative to the first portion about the rotational axis. The first portion is fixedly coupled to the hub and the second portion is fixedly coupled to the spoke.

In some implementations, the hinging mechanism includes a locking mechanism actuatable between an engaged position and a disengaged position. The locking mechanism prevents the steering grip from rotating relative to the hub when the locking mechanism is in the engaged position.

In some implementations, the locking mechanism includes one or more openings defined by either the first portion or the second portion, and the locking mechanism includes one or more locking solenoids actuatable between a retracted position and an extended position. A rod of the one or more locking solenoids extends into an opening to prevent rotation of the steering grip about the rotational axis when the one or more locking solenoids are in the extended position.

In some implementations, the portion of the locking mechanism defining the one or more openings, the rod of the locking solenoid, or both include heat treated metal.

In some implementations, the one or more openings include a first opening and a second opening. The steering grip is in the first position when the rod of the locking solenoid is engaged with the first opening, and the steering grip is in the second position when the rod of the locking solenoid is engaged with the second opening.

In some implementations, the locking mechanism includes three or more openings and the steering grip is in a different position relative to the hub when the rod of the locking solenoid is engaged with each of the three or more openings.

In some implementations, each of the one or more locking solenoids includes a sensor for detecting whether the rod has fully extended to the extended position.

BRIEF DESCRIPTION OF DRAWINGS

Example features and implementations are disclosed in the accompanying drawings. However, the present disclosure is not limited to the precise arrangements and instrumentalities shown. Similar elements in different implementations are designated using the same reference numerals.

DETAILED DESCRIPTION

Figure 1:
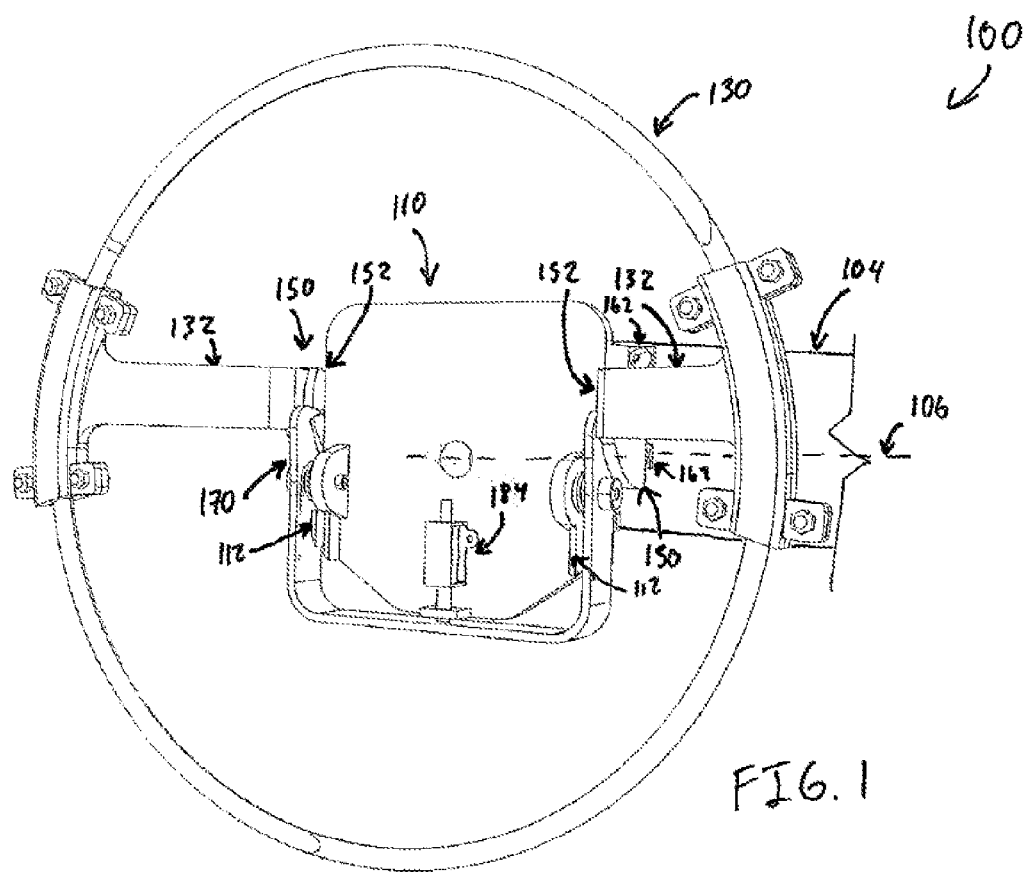
FIG. 1 is a perspective view of a steering wheel assembly, according to one implementation.

The devices, systems, and methods disclosed herein provide for a steering wheel capable of rotating from the normal driving position to a horizontal position.

For example, various implementations include a steering wheel assembly. The assembly includes a hub, a steering grip, spokes extending between the hub and the steering grip, and a hinging mechanism. The hub is configured to be rotatably coupled to a steering column such that the hub is rotatable about a central axis of the steering column. The steering grip has one or more spokes. The hinging mechanism couples the one or more spokes to the hub such that the steering grip and spokes are rotatable relative to the hub about a rotational axis from a first position to a second position. The rotational axis is perpendicular to the central axis of the steering column.

FIGS. 1-15 show one implementation of a steering wheel assembly 100. The assembly 100 includes a hub 110, a steering grip 130, spokes 132, a hinging mechanism 150, and a locking mechanism 170. The hub 110 is rotatably coupled to a steering column 104 of a vehicle (not shown). The steering column 104 has a central axis 106. When the hub 110 of the assembly 100 is coupled to the steering column 104 of the vehicle, the hub 110 is rotatable about the central axis 106 of the steering column 104.

First and second spokes 132 extend radially between the hub 110 and the steering grip 130 and are fixedly coupled to the steering grip 130. However, in other implementations, any number of spokes extend between the hub and the steering grip. In addition, the steering grip 130 shown in FIGS. 1-15, as viewed from a plan view, has a circular footprint, but in other implementations, the shape of the steering grip may be a partial circle or other suitable shape.

Figure 2:
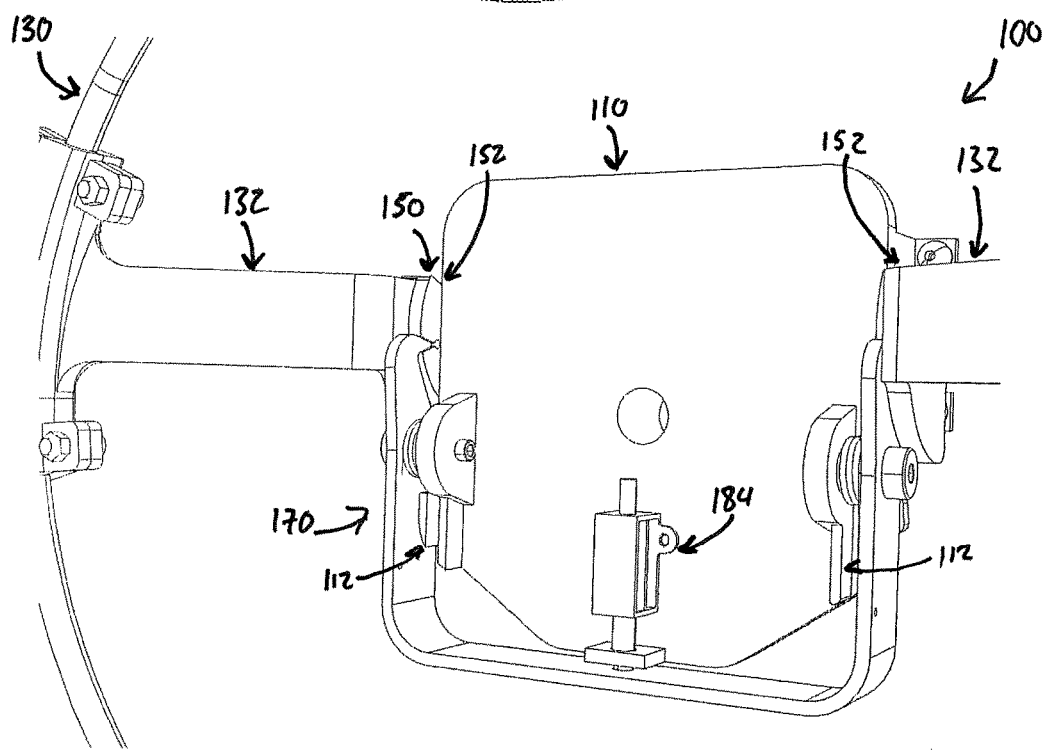
FIG. 2 is a detail view of the hub of the steering wheel assembly of FIG. 1 in the first position.
Figure 3:
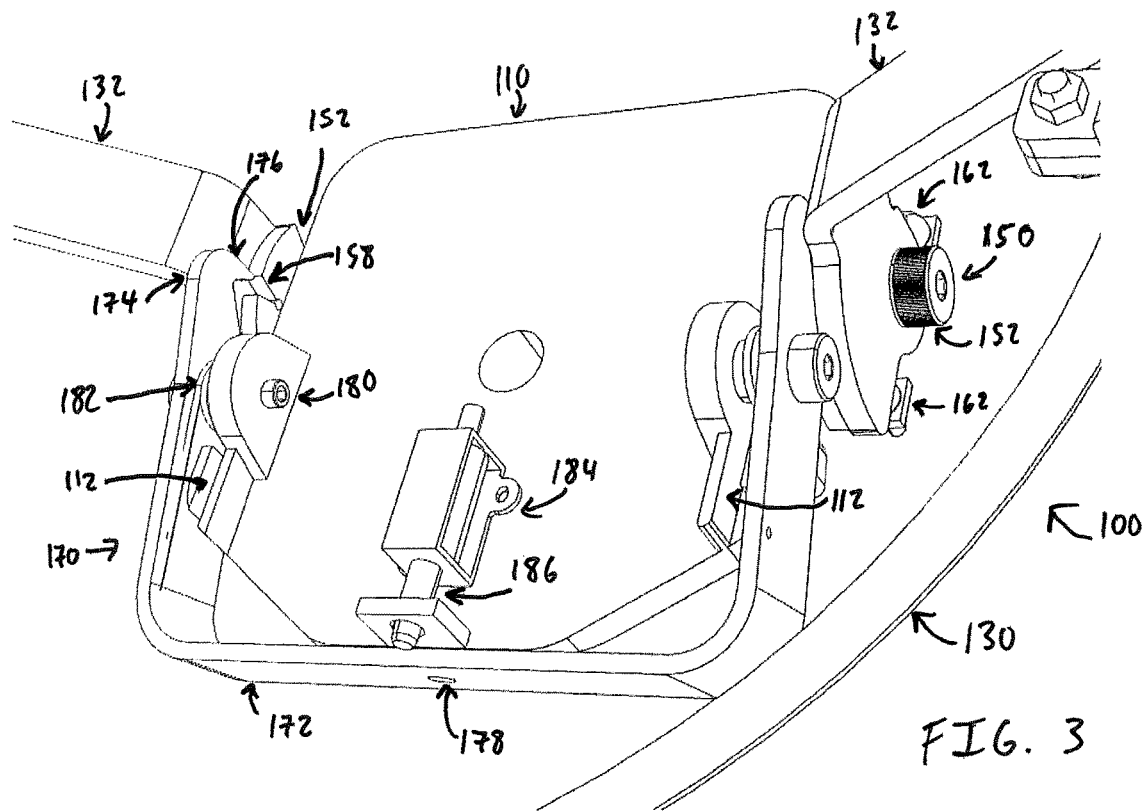
FIG. 3 is a detail view of the steering wheel assembly of FIG. 1 rotating between the first position and the second position.
Figure 4:
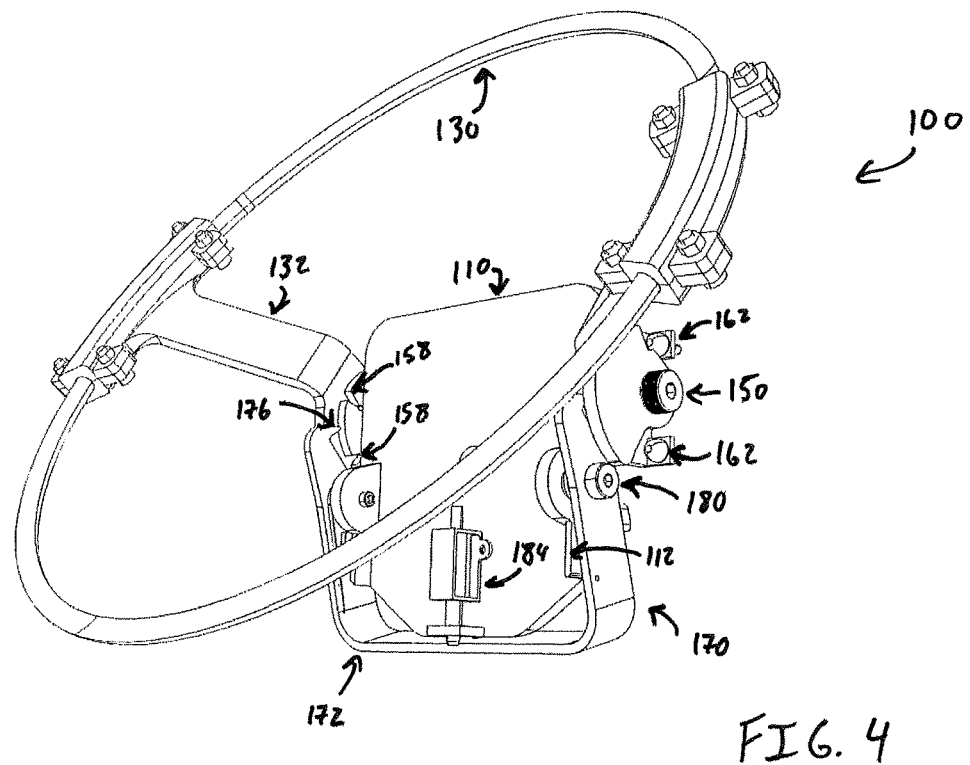
FIG. 4 is a perspective view of the steering wheel assembly of FIG. 1 rotating between the first position and the second position.
Figure 5:
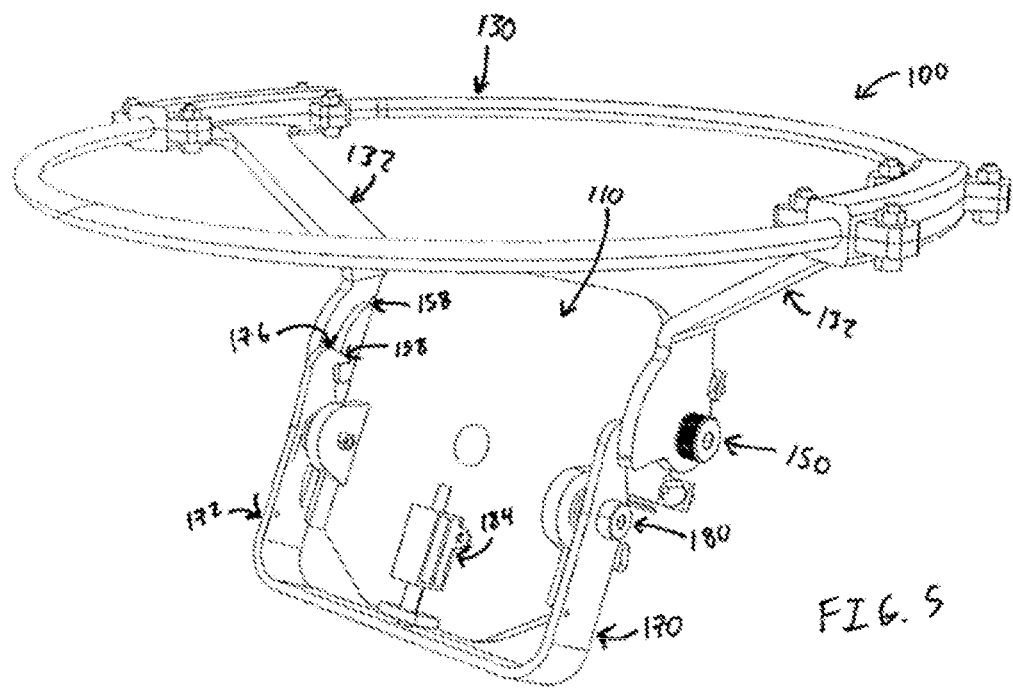
FIG. 5 is a perspective view of the steering wheel assembly of FIG. 1 in the second position.
Figure 6:
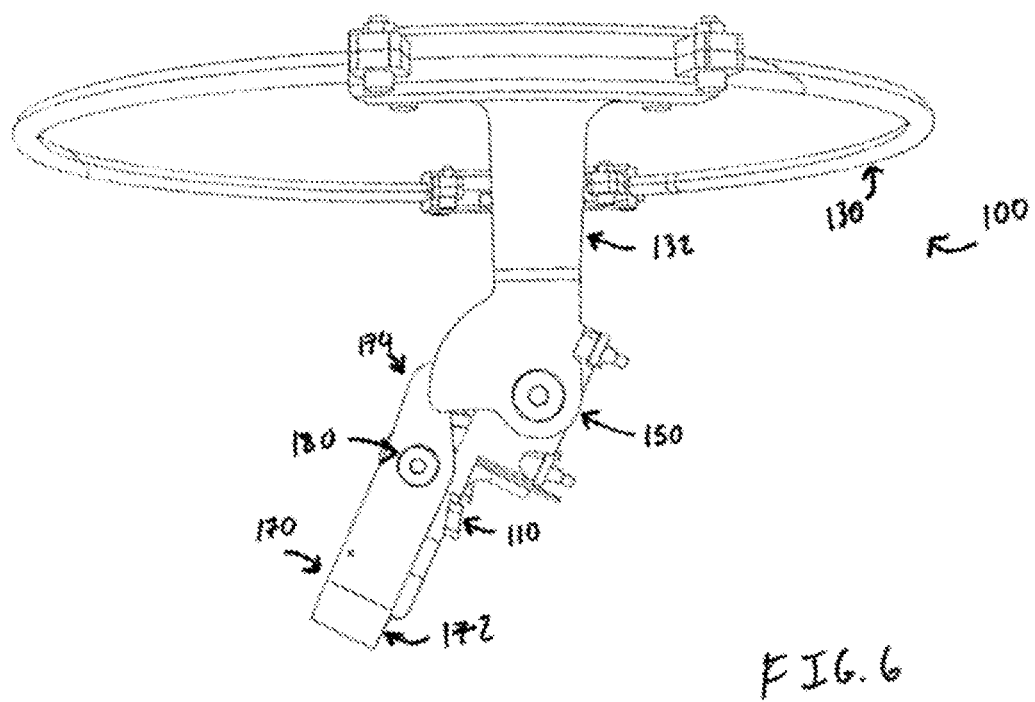
FIG. 6 is a side view of the steering wheel assembly of FIG. 1 in the second position.
Figure 7:
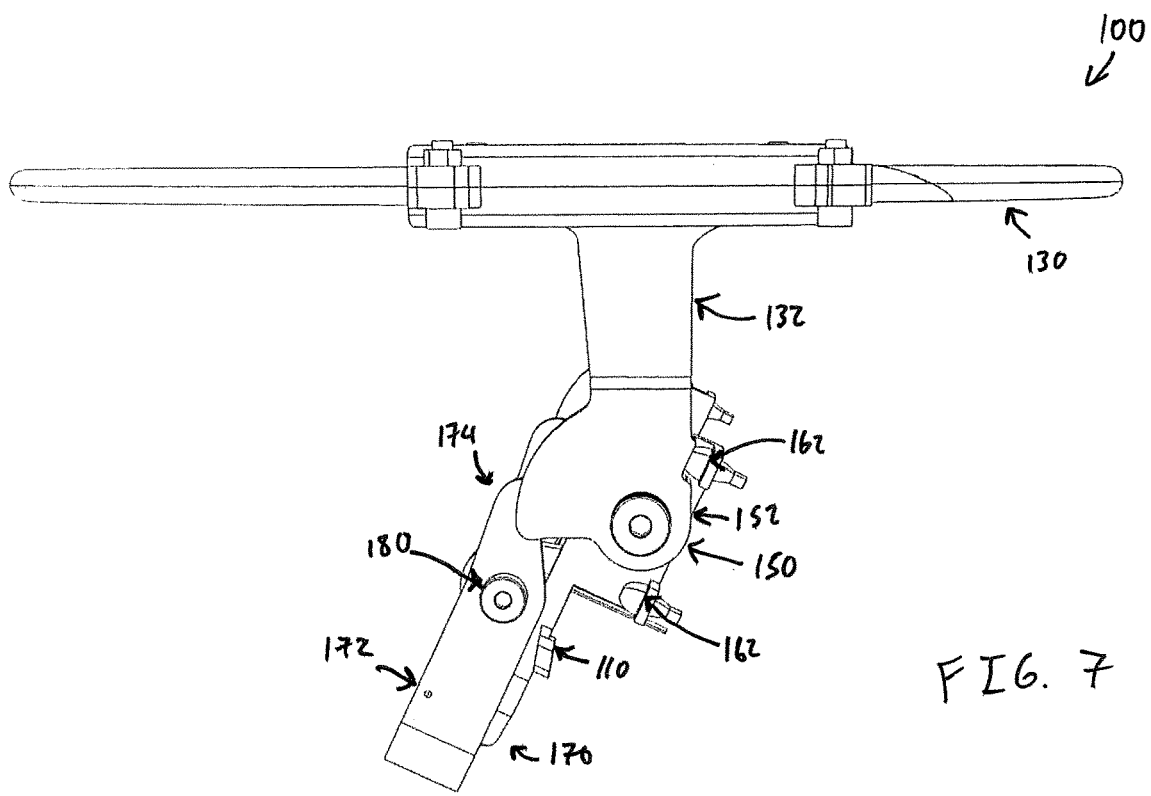
FIG. 7 is a side view of the steering wheel assembly of FIG. 1 in the second position.

The hinging mechanism 150 includes two hinges 152. Each of the two hinges 152 includes a first portion 154 and a second portion 156. The first portion 154 of each hinge 152 is fixedly coupled to the hub 110 such that each of the first portions 154 is nonrotatable with respect to the hub 110. The second portion 156 of each hinge 152 is fixedly coupled to one of the two spokes 132 such that each of the second portions 156 is nonrotatable with respect to the steering grip 130 and spokes 132. The first portion 154 and second portion 156 of each hinge 152 in the hinging mechanism 150 are rotatable with respect to each other about a rotational axis 160, shown in FIGS. 9-11. The rotational axis 160 is perpendicular to the central axis 106 of the steering column 104 when the hub 110 is coupled to the steering column 104. Because the first portion 154 of each hinge 152 is fixedly coupled to the hub 110, the second portion 156 of each hinge 152 is fixedly coupled to the spoke 132, and the first portion 154 and the second portion 156 of each hinge 152 are rotatable with respect to each other, the steering grip 130 and spokes 132 are also rotatable relative to the hub 110 about the rotational axis 160. The steering grip 130 and spokes 132 are rotatable from a first position, shown in FIGS. 1 and 2, to a second position, shown in FIGS. 5-7. The first position shown in FIGS. 1 and 2 is a normal driving position. The second position shown in FIGS. 5-7 is a horizontal, non-driving position.

Each of the two hinges 152 of the hinging mechanism 150 also includes two bumpers 162 made of a resilient material. A first of the two bumpers 162 is positioned such that the second portion 156 of the hinge 152 abuts and compresses the bumper 162 when the steering grip 130 and spokes 132 are in the first position. A second of the two bumpers 162 is positioned such that the second portion 156 of the hinge 152 abuts and compresses the bumper 162 when the steering grip 130 and spokes 132 are in the second position. The bumpers 162 protect the hinging mechanism 150 from wear during use and prevent vibration of, and noise from, the assembly 100 when the vehicle is being operated. The bumpers 162 shown in FIGS. 1-15 are made of rubber, but in other implementations, the bumpers are made from any other resilient material capable of being compressed and of dampening noise and vibration.

The assembly 100 also includes a locking mechanism 170 for preventing the steering grip 130 and spokes 132 from rotating relative to the hub 110 when the locking mechanism 170 is engaged. The locking mechanism 170 shown in FIGS. 1-9 and 12-14 includes a u-shaped handlebar 172 rotatably coupled to the hub 110 by two hinged connections 180. The handlebar 172 has two ends 174, and a protrusion 176 extends from each end 174 of the handlebar 172.

The second portion 156 of each hinge 152 of the hinging mechanism 150 includes a semicircular edge defining two v-shaped grooves 158 that are spaced apart circumferentially along the edge. The ends 174 of the handlebar 172 define a hook shape, and the protrusion 176 is a tip of the hook shaped end 174. The protrusion 176 is v-shaped and is shaped to engage the grooves 158 of the second portion 156. Unintentional rotation of the second portion 156 relative to the first portion 154 is prevented when the protrusions 176 engage within one of the grooves 158.

The handlebar 172 of the locking mechanism 170 is rotatable about the hinged connection 180 to actuate the locking mechanism 170 between an engaged position in which the protrusions 176 are removably engaged within one of the grooves 158 and a disengaged position in which the protrusions 176 are disposed outside of one of the grooves 158. A spring 182 is disposed circumferentially around the axle of each hinge 152 of the hinging mechanism 150 and biases the handlebar 172 toward one of the engaged positions. The hub 110 includes two pairs of spring arm retention protrusions 112, and an end portion 188 of each spring 182 is disposed between one of the pairs of spring arm retention protrusions 112. The spring arm retention protrusions 112 ensure that the end portion 188 of the spring 182 remains secured during operation.

When the locking mechanism 170 is in the engaged position with the protrusions 176 disposed in a first set of v-shaped grooves 158, the second portions 156 of the hinging mechanism 150 are prevented from rotating relative to the first portions 154 of the hinging mechanism 150, and thus, the steering grip 130 and spokes 132 are prevented from rotating relative to the hub 110. By actuating the locking mechanism 170 and rotating the steering grip 130 and spokes 132, the steering grip 130 and spokes 132 can be moved from the first position to the second position. The locking mechanism 170 can be actuated to the disengaged position by rotating the handlebar 172 to remove the protrusions 176 from the first set of grooves 158. When the locking mechanism 170 is in the disengaged position, the steering grip 130 and spokes 132 can be rotated about the rotational axis 160 relative to the hub 110 from the first position to the second position. Once the steering grip 130 and spokes 132 are rotated such that the protrusions 176 are aligned with a second set of grooves 158, the locking mechanism 170 can be actuated back to the engaged position by rotating the handlebar 172 to engage the protrusions 176 with the second set of grooves 158. The rotation of the steering grip 130 and spokes 132 from the disengaged position to the engaged position can be performed manually or can be caused or aided by the biasing of the spring 182.

Each of the v-shaped grooves 158 of the second portions 156 and the protrusions 176 are made of metal and are heat treated to harden the v-shaped grooves 158 and the protrusions 176 to prevent wear during use. However, in other implementations, the v-shaped grooves of the second portions and the protrusions are hardened and/or strengthened by any other technique.

Although the second portions 156 of the hinges 152 of the hinging mechanism 150 shown in FIGS. 1-15 define v-shaped grooves, in other implementations, the second portions define any shape openings, and the protrusions are sized to be disposed within the openings in the second portions. In other implementations, the first portions define the v-shaped grooves or other openings, and the protrusions are configured to engage the openings to prevent rotation of the steering grip and spokes relative to the hub. Although the second portions 156 of the hinges 152 of the hinging mechanism 150 shown in FIGS. 1-15 each define two v-shaped grooves, in other implementations, each of the second portions define three or more grooves or openings to allow the steering grip to be rotated to, and the locking mechanism to be engaged in, three or more positions.

To prevent accidental actuation of the locking mechanism 170, a locking solenoid 184 is coupled to the hub 110 to engage the handlebar 172 and prevent the handlebar 172 from rotating to the disengaged position. The locking solenoid 184 includes an extendable rod 186 and is actuatable between a retracted position and an extended position. The handlebar 172 defines a solenoid opening 178, and the rod 186 of the locking solenoid 184 is disposed within the solenoid opening 178 when the locking solenoid 184 is in the extended position. When the rod 186 of the locking solenoid 184 is disposed in the solenoid opening 178 defined by the handlebar 172, the locking mechanism 170 is in the engaged position, and the handlebar 172 is prevented from rotating to the disengaged position. When the locking solenoid 184 is actuated to the retracted position, the rod 186 of the locking solenoid 184 is disposed outside of the solenoid opening 178 and the handlebar 172 can be rotated to disengage the locking mechanism 170.

The locking solenoid 184 can be configured to retract the rod 186 to the retracted position when the vehicle is in park and to extend the rod 186 to the extended position when the vehicle is shifted out of park. The locking solenoid 184 also includes a sensor to detect whether the rod 186 has fully extended to the extended position to confirm to the vehicle that the steering grip 130 and spokes 132 are engaged in the first or second position.

Figure 8:
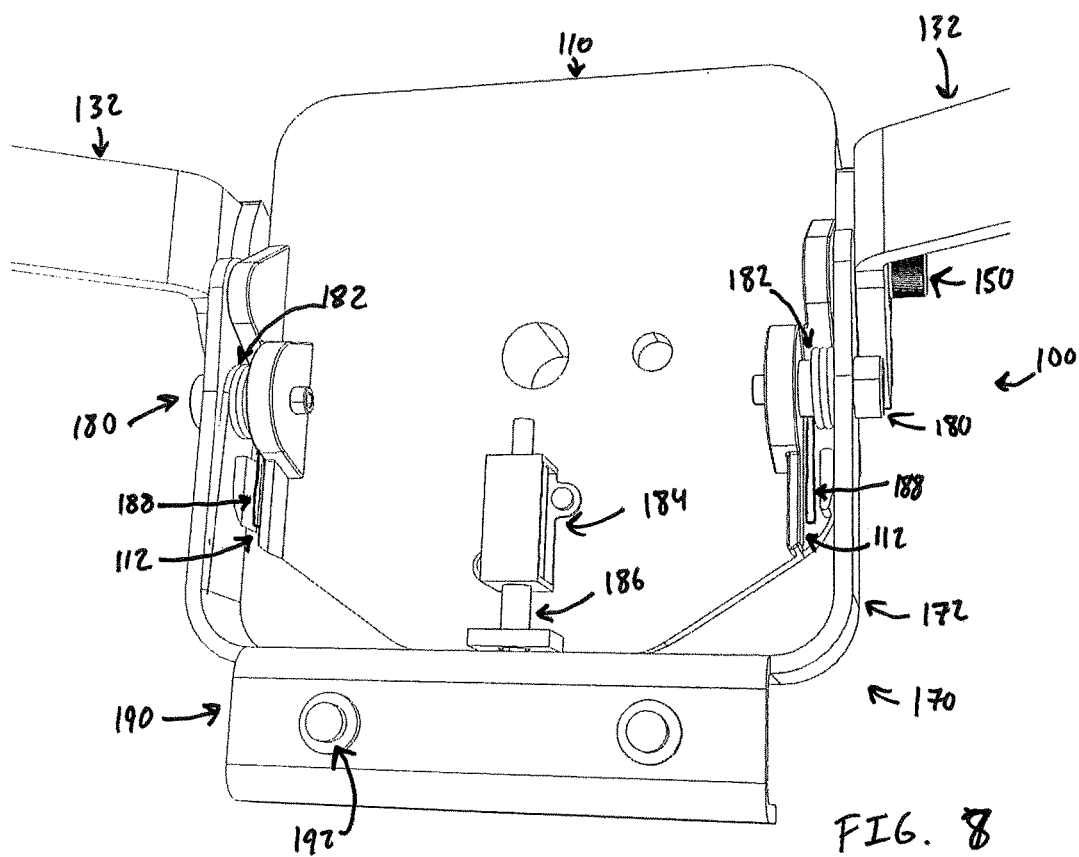
FIG. 8 is a detail view of the steering wheel assembly of FIG. 1 with a control pad coupled to the handlebar.
Figure 9:
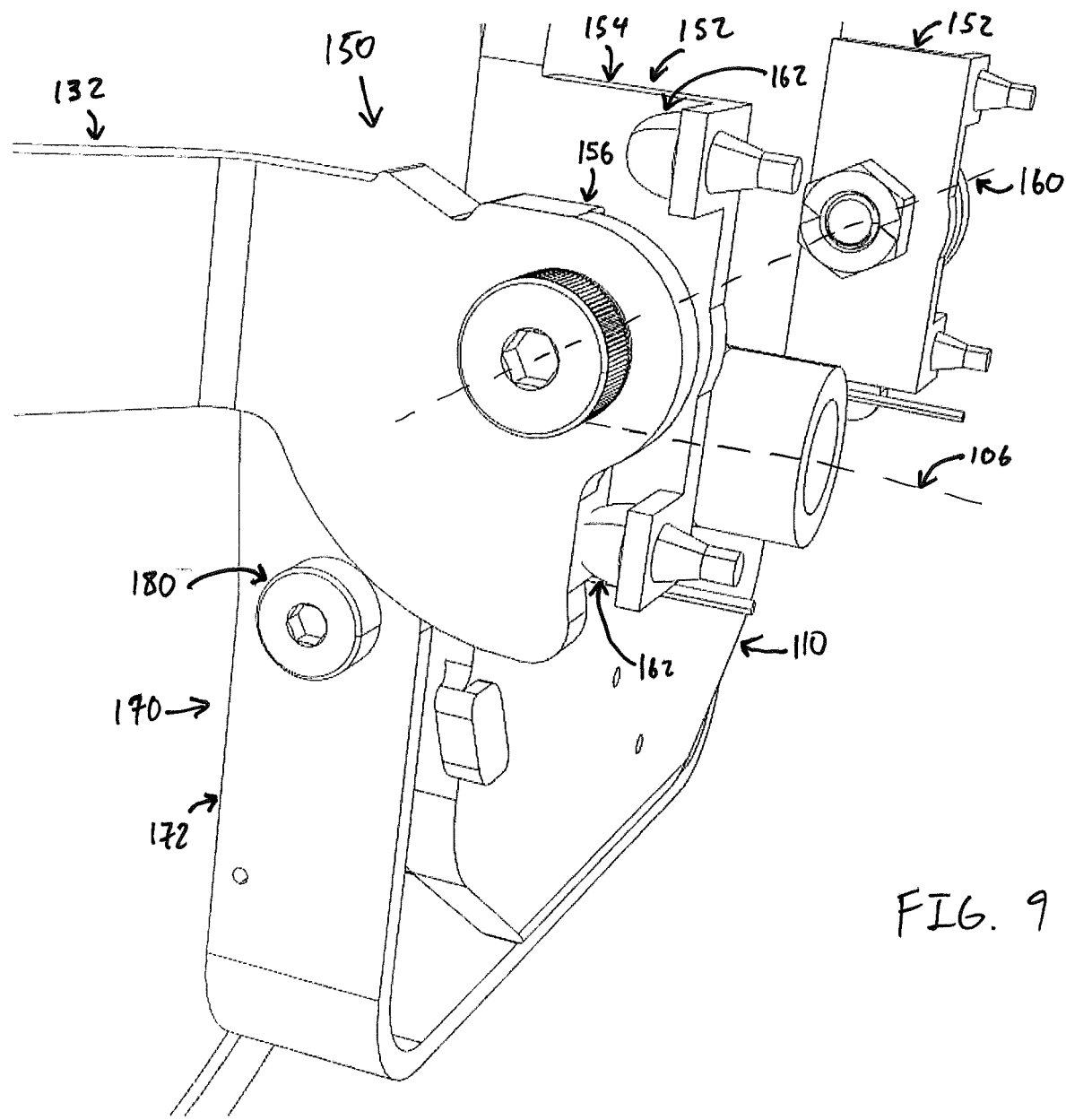
FIG. 9 is a detail view of the hinging mechanism of the steering wheel assembly of FIG. 1.
Figure 10:
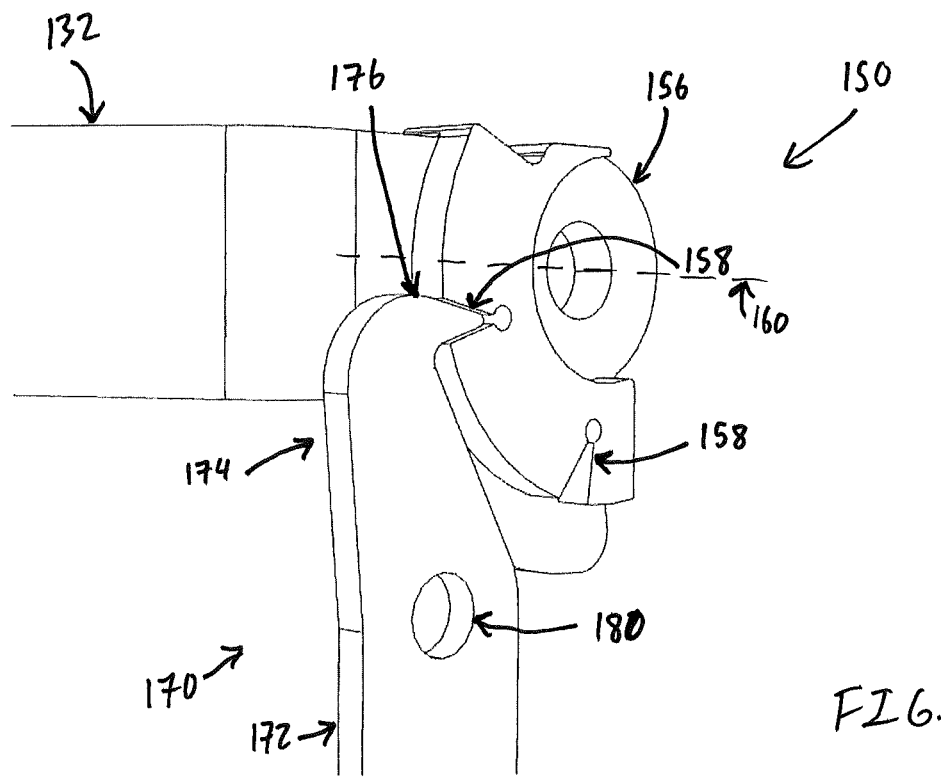
FIG. 10 is a detail view of the hinging mechanism and locking mechanism of the steering wheel assembly of FIG. 1.
Figure 11:
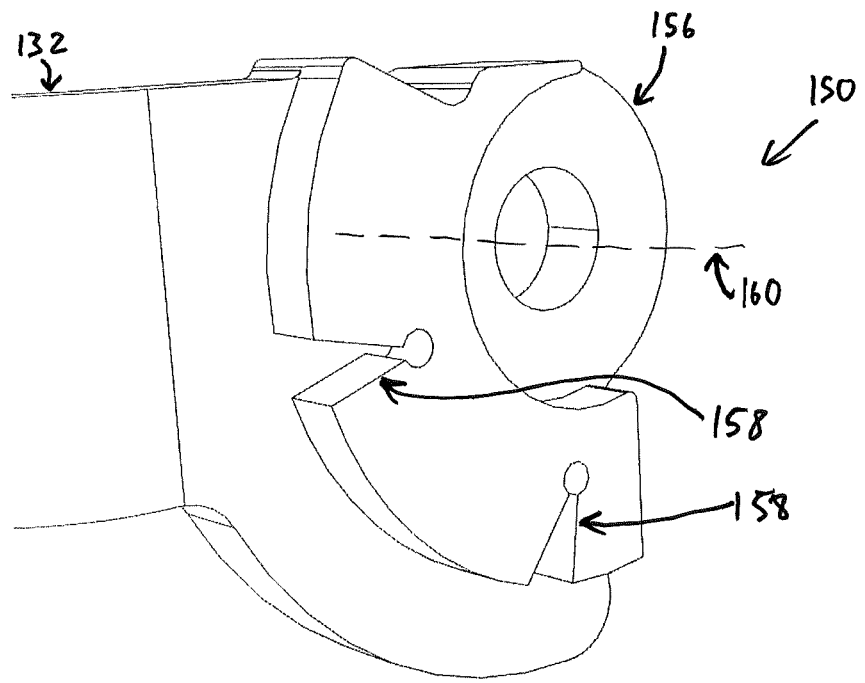
FIG. 11 is a detail view of the hinging mechanism of the steering wheel assembly of FIG. 1.
Figure 12:
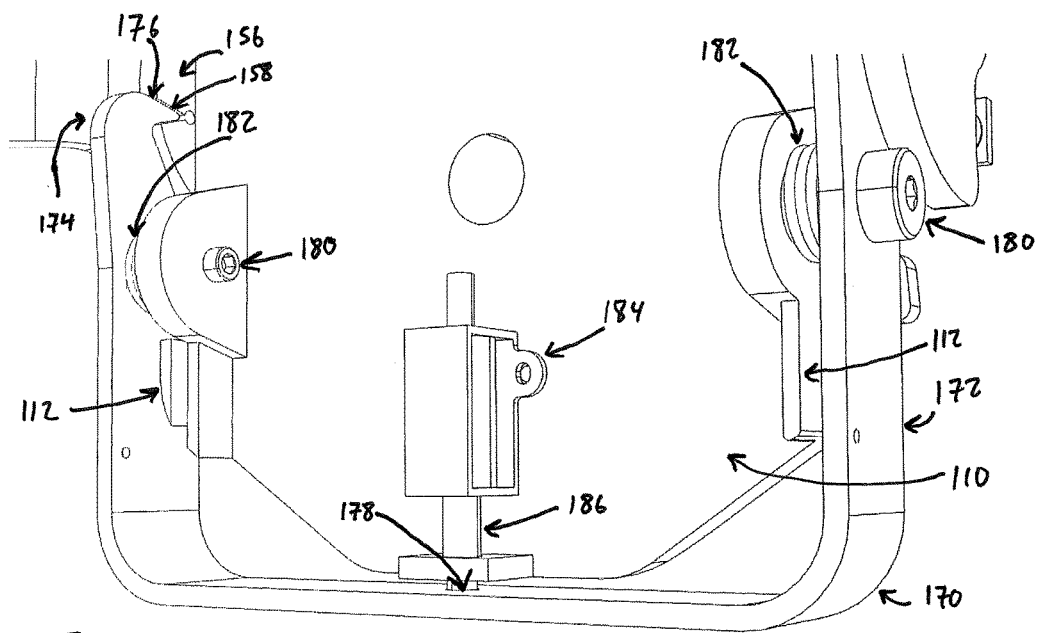
FIG. 12 is a detail view of the locking solenoid and locking mechanism of the steering wheel assembly of FIG. 1.
Figure 13:
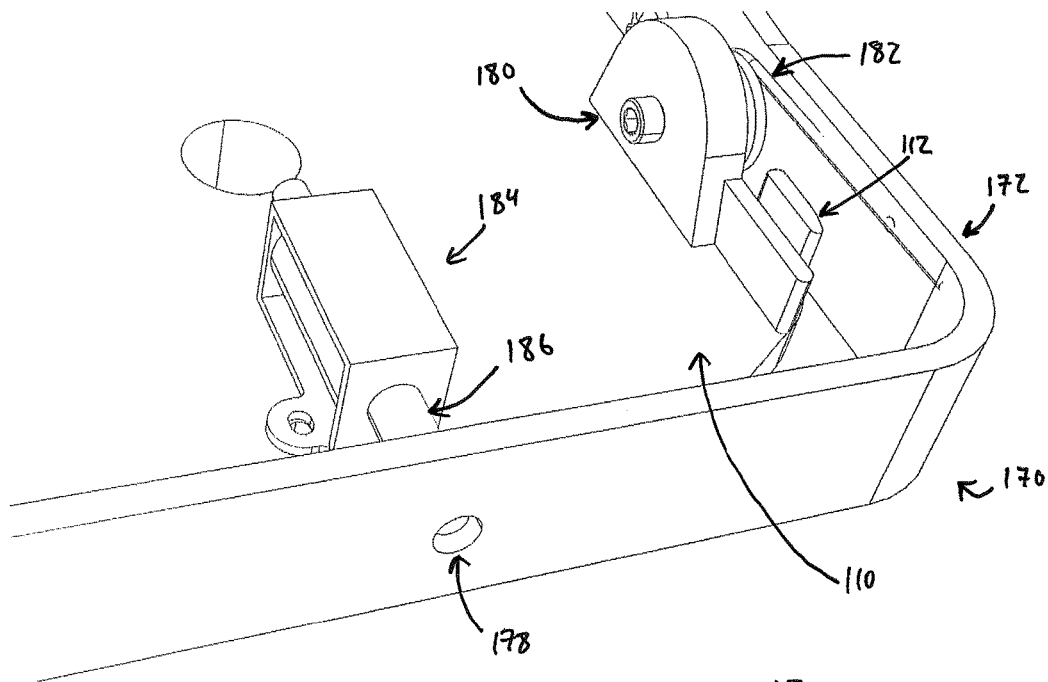
FIG. 13 is a detail view of the locking solenoid and locking mechanism of the steering wheel assembly of FIG. 1.
Figure 14:
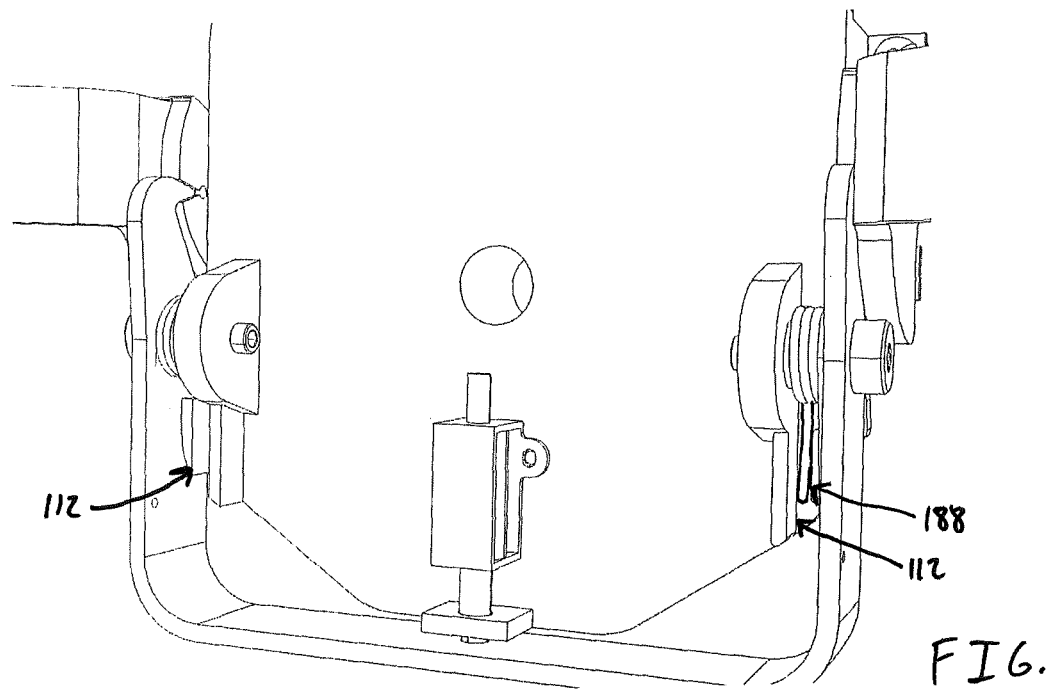
FIG. 14 is a detail view of the locking solenoid and locking mechanism of the steering wheel assembly of FIG. 1.
Figure 15:
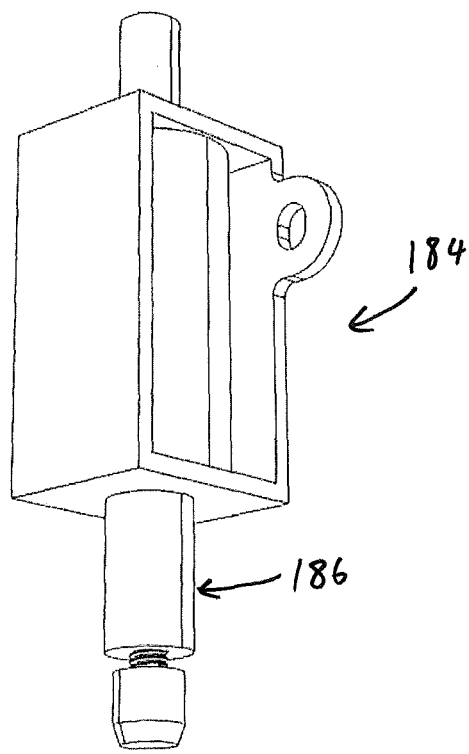
FIG. 15 is a detail view of the locking solenoid of the steering wheel assembly of FIG. 1.
Figure 16:
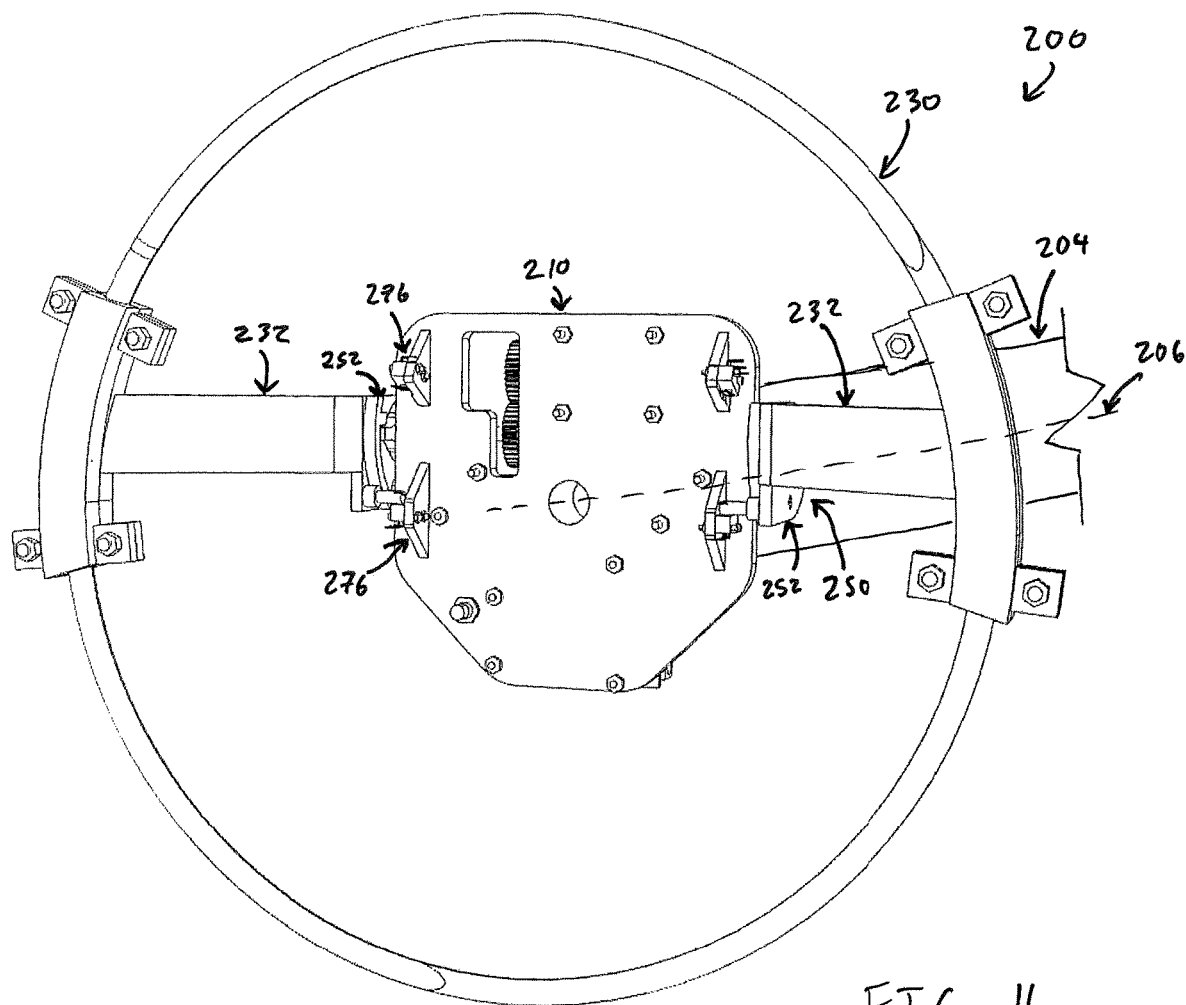
FIG. 16 is a perspective view of a steering wheel assembly, according to another implementation.
Figure 17:
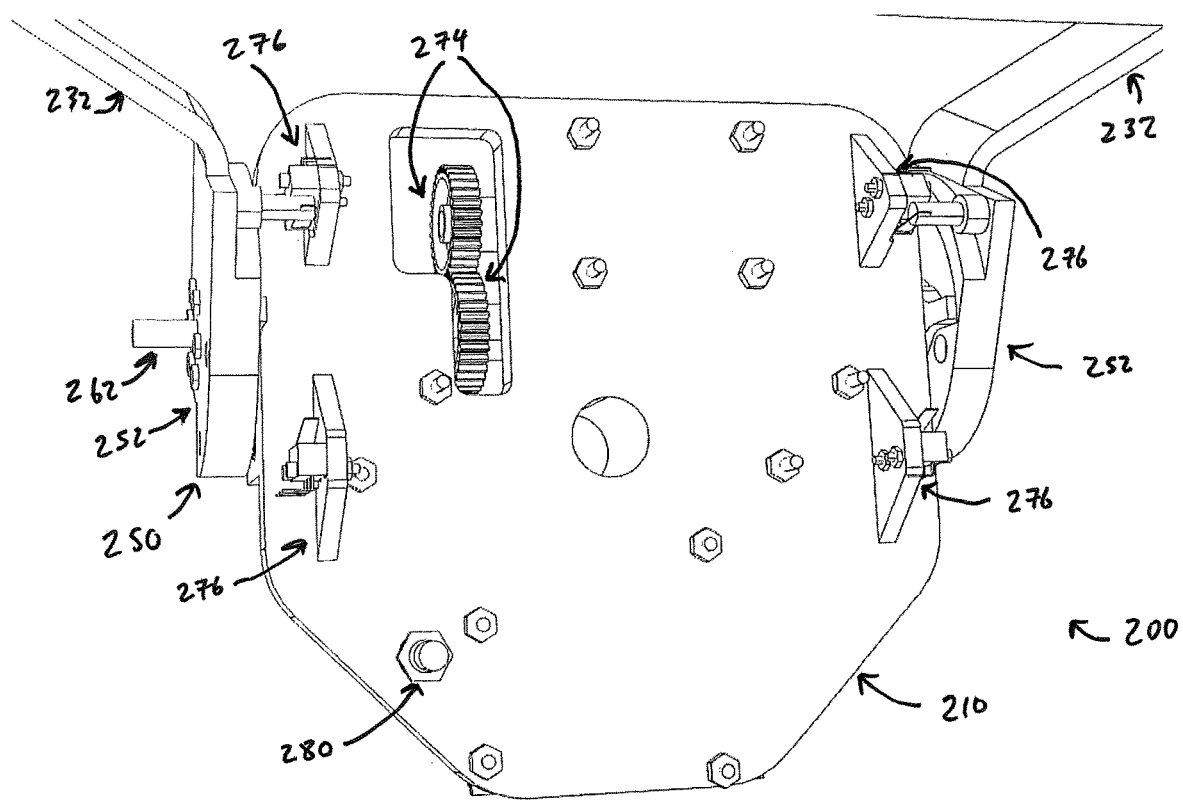
FIG. 17 is a detail view of the hub of the steering wheel assembly of FIG. 16 in the second position.
Figure 18:
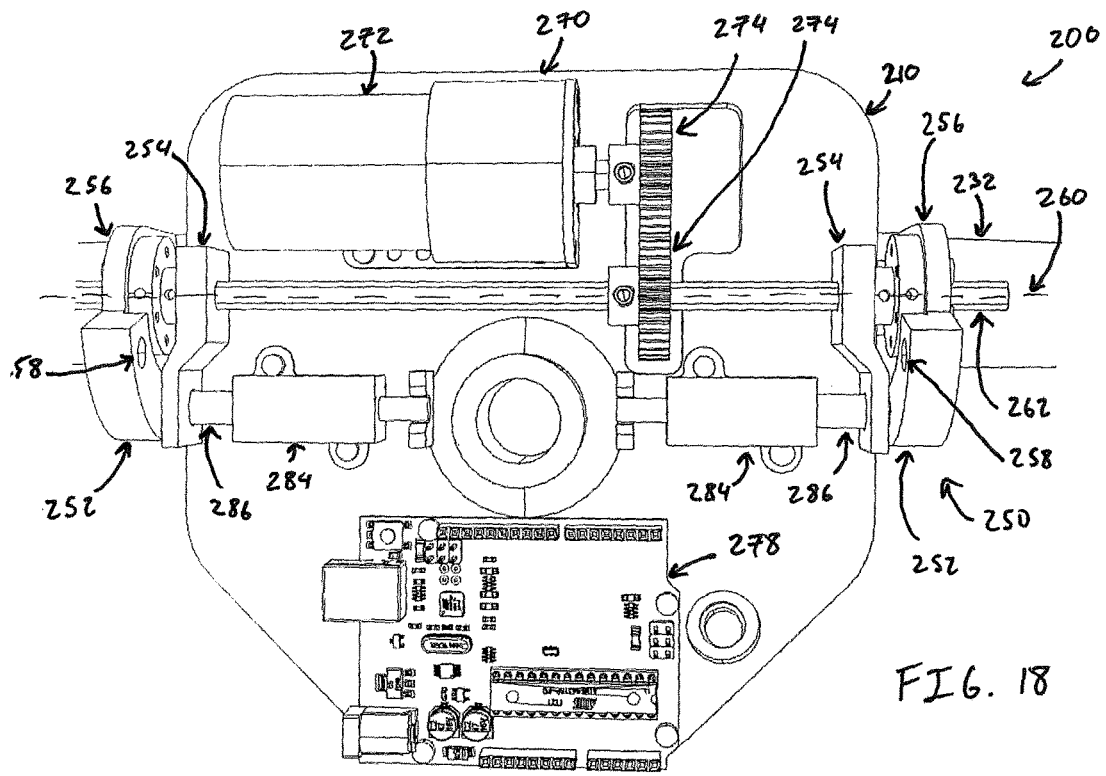
FIG. 18 is a detail view of the hub and drive system of the steering wheel assembly of FIG. 16.
Figure 19:
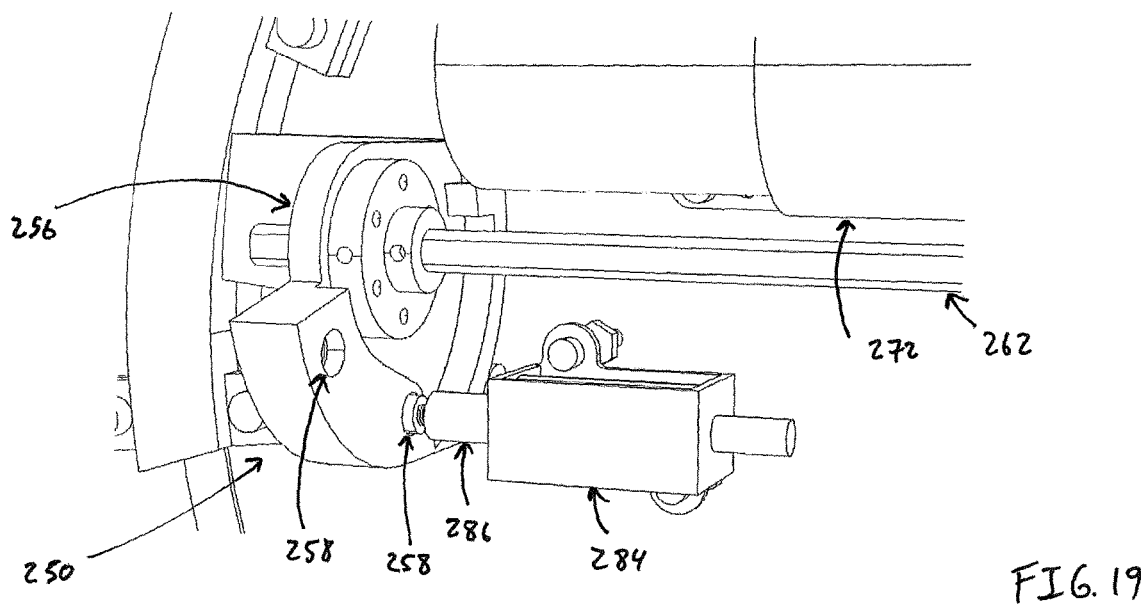
FIG. 19 is a detail view of the hinging mechanism and locking solenoid of the steering wheel assembly of FIG. 16.
Figure 20:
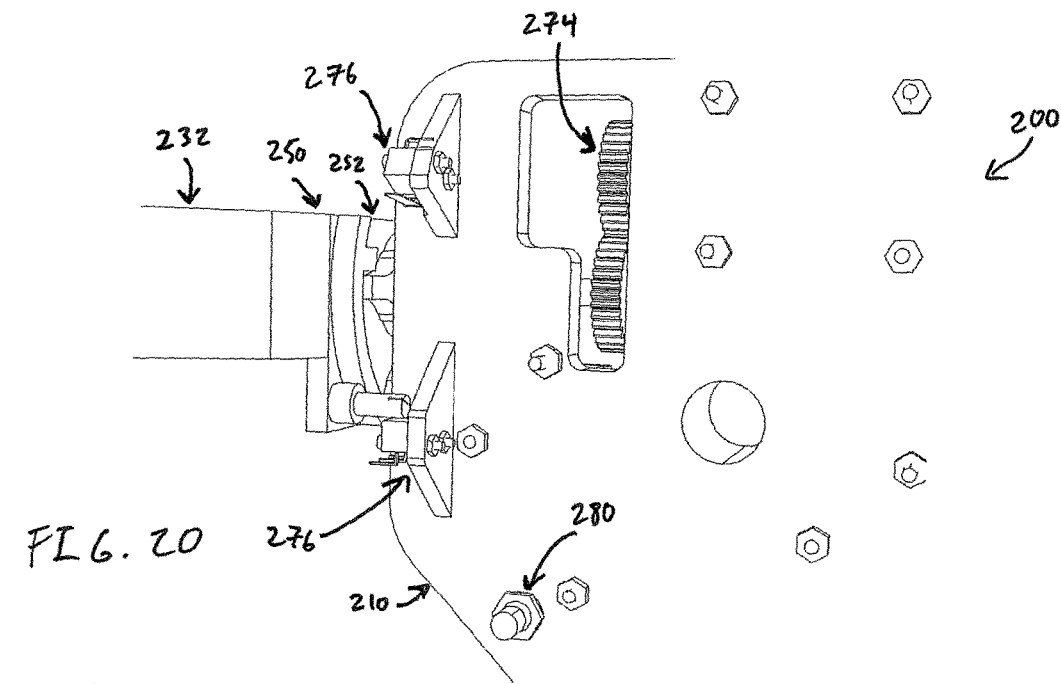
FIG. 20 is a detail view of the positional sensors of the steering wheel assembly of FIG. 16.
Figure 21:
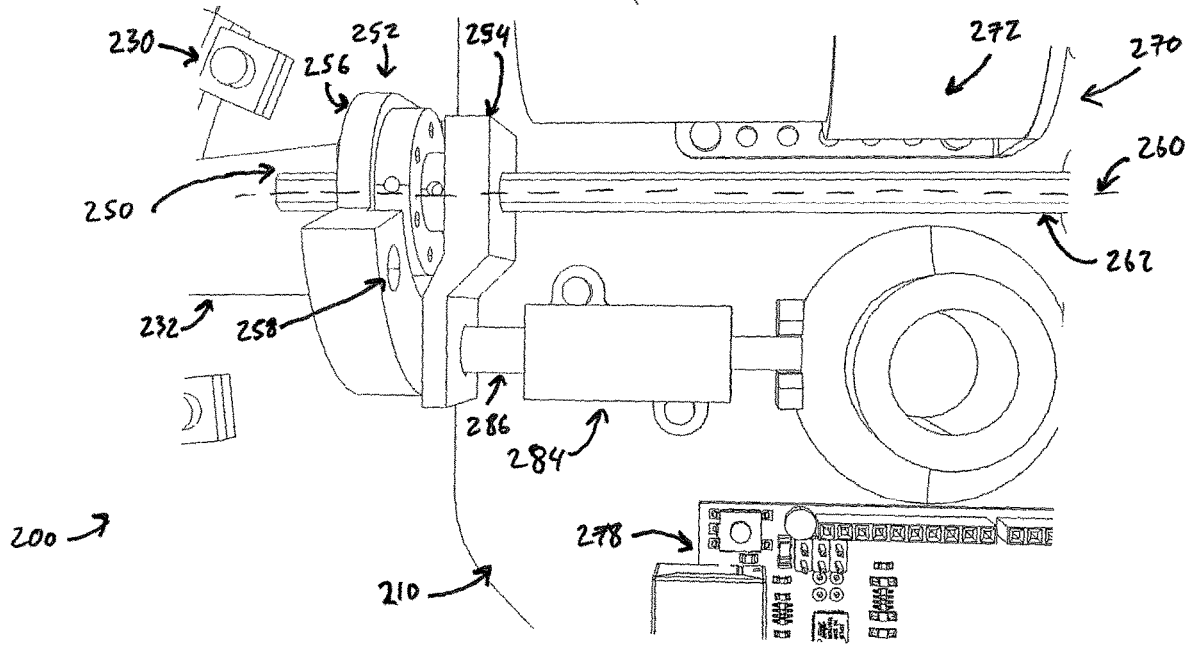
FIG. 21 is a detail view of the hinging mechanism and locking solenoid of the steering wheel assembly of FIG. 16.
Figure 22:
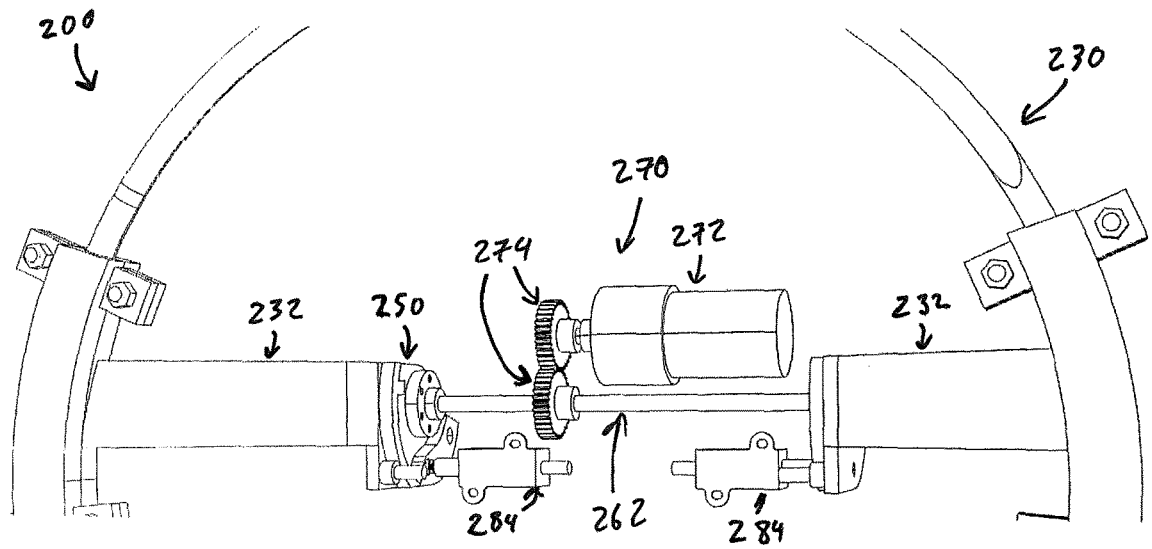
FIG. 22 is a perspective view of the hinging mechanism and drive system of the steering wheel assembly of FIG. 16.
Figure 23:
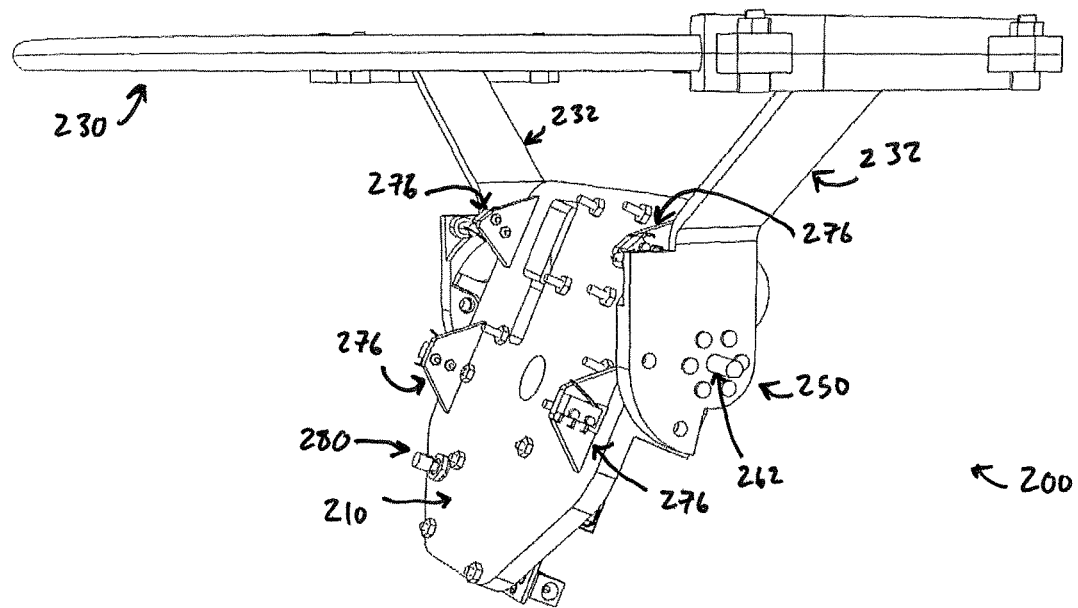
FIG. 23 is a perspective view of the steering wheel assembly of FIG. 16 in the second position.
Figure 24:
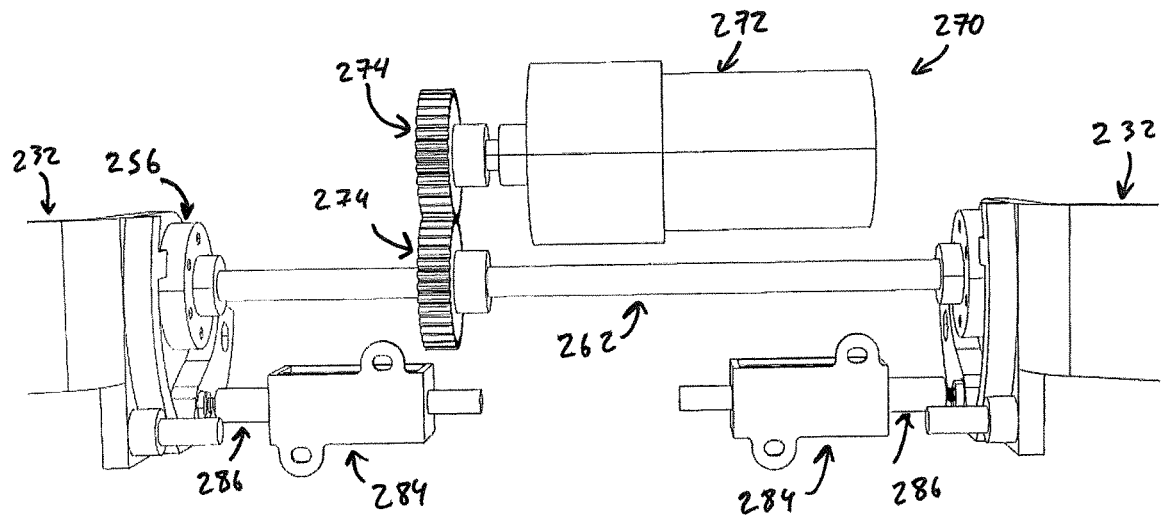
FIG. 24 is a perspective view of the hinging mechanism, locking solenoids, and drive system of the steering wheel assembly of FIG. 16.
Figure 25:
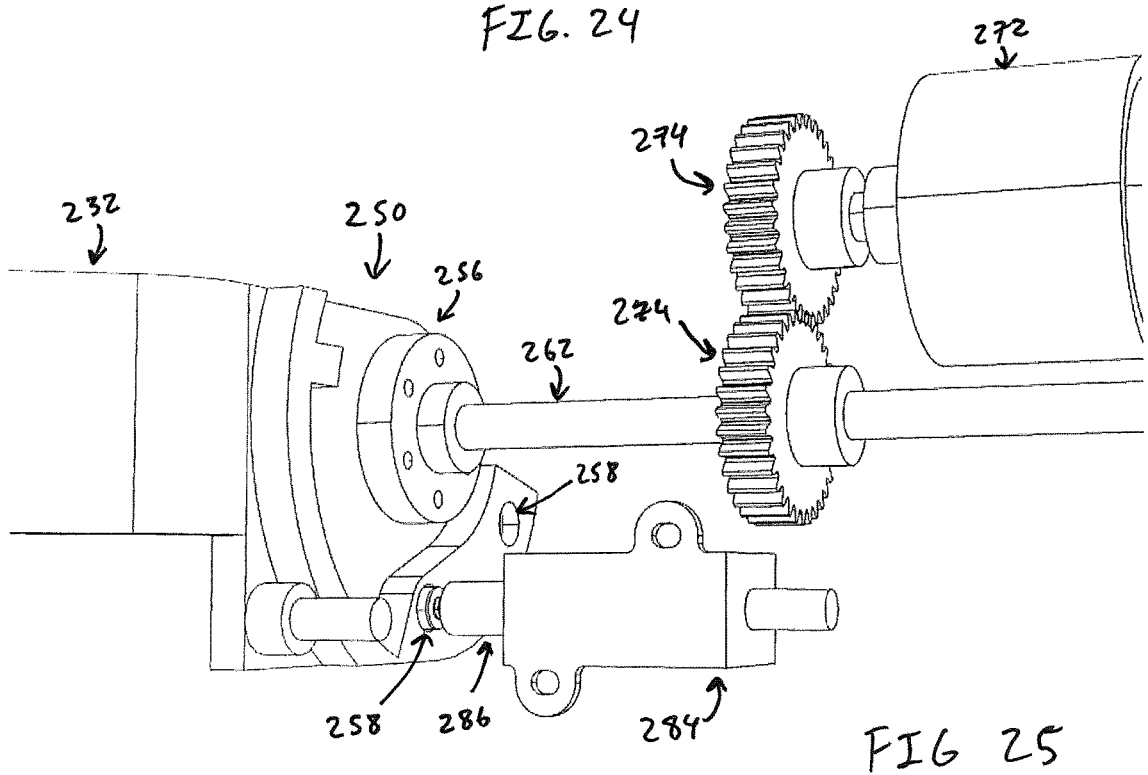
FIG. 25 is a perspective view of the hinging mechanism, locking solenoids, and drive system of the steering wheel assembly of FIG. 16.

FIG. 8 shows the assembly 100 shown in FIG. 1, but FIG. 8 includes an optional control pad 190. The control pad 190 is coupled to the handlebar 172 of the locking mechanism 170 such that the control pad 190 is accessible to a driver. The control pad 190 includes an activation button 192 for actuating the locking solenoid 184 from the extended position to the retracted position. For safety reasons, when the vehicle is not in park, pressing the activation button 192 will not cause the locking solenoid 184 to actuate from the extended position to the retracted position. However, when the vehicle is in park, pressing the activation button 192 will allow the driver to actuate the locking solenoid 184 from the extended position to the retracted position such that the locking mechanism 170 can be disengaged.

FIGS. 16-25 show another implementation of a steering wheel assembly 200. Similar to the assembly 100 shown in FIGS. 1-15, the assembly 200 includes a hub 210, a steering grip 230, and a hinging mechanism 250. Reference numbers similar to those used for assembly 100 in FIGS. 1-15 are used to identify similar features in the assembly 200 shown in FIGS. 16-25. The assembly 200 shown in FIGS. 16-25 also includes a drive system 270 for rotating the steering grip 230 between the first and second positions.

The drive system 270 includes a motor 272, drive gears 274, positional sensors 276, a controller 278, and an activation button 280. The motor 272 is coupled to the hub 210. A drive gear 274 coupled to the shaft of the motor 272 engages a drive gear coupled to an axle 262 extending along the rotational axis 260 between the hinges 252 of the hinging mechanism 250. When the motor 272 is activated, the motor 272 rotates the drive gears 274 to rotate the axle 262 of the hinges 252, causing the steering grip 230 to rotate about the rotational axis 260 relative to the hub 210.

A first positional sensor 276 is configured to detect a portion of the hinging mechanism 250 when the steering grip 230 is in the first position, and a second positional sensor 276 is configured to detect a portion of the hinging mechanism 250 when the steering grip 230 is in the second position. The positional sensors 276 shown in FIGS. 16, 17, 20, and 23 are Hall effect sensors, but in other implementations, the positional sensors are limit switches or any other sensor capable of detecting the rotational position of the hinging mechanism.

The activation button 280 is configured to send an input signal to the controller 278 when the activation button 280 is pressed, causing the controller 278 to send an output signal to activate the motor 272. When the motor 272 has caused the steering grip 230 to rotate from the first position to the second position, the second positional sensor 276 detects a portion of the hinging mechanism 250 and sends a signal to the controller 278, causing the controller 278 to end the activation signal to the motor 272. The activation button 280 can be pressed again to cause the steering grip 230 to rotate from the second position to the first position. When the first positional sensor 276 detects a portion of the hinging mechanism 250, the first positional sensor 276 sends a signal to the controller 278, causing the controller 278 to end the activation signal to the motor 272. The activation button 280 is shown on the hub 210, but in other implementations, the activation button may be in any location conveniently located for the occupant, including the infotainment or dashboard portion of the vehicle or with the traditional steering wheel button controls, such as cruise control and volume.

The hinging mechanism 250 includes two locking solenoids 284 to prevent accidental actuation of the drive system 270. The two locking solenoids 284 are coupled to the hub 210 to engage an opening 258 in the second portions 256 of the hinging mechanism 250. The locking solenoids 284 each include an extendable rod 286 and are actuatable between a retracted position and an extended position. The rod 286 of each locking solenoid 284 is disposed within an opening 258 when the locking solenoid 284 is in the extended position. When the rod 286 of each locking solenoid 284 is disposed in an opening 258, the hinging mechanism 250 is prevented from rotating between the first position and the second position. When the locking solenoids 284 are actuated to the retracted position, the rods 286 of each locking solenoid 284 are disposed outside of the openings 258, and the hinging mechanism 250 can be rotated between the first position and the second position. Although the second portions 256 of the hinges 252 of the hinging mechanism 250 shown in FIGS. 16-25 each define two openings 258, in other implementations, each of the second portions define three or more openings to allow the steering grip to be rotated to, and the locking mechanism to be engaged in, three or more positions.

Each of the openings 258 of the second portions 256 and the rods 286 of the locking solenoids 284 are made of metal and are heat treated to harden the openings 258 and the rods 286 to prevent wear during use. However, in other implementations, the openings of the second portions and the rods of the locking solenoids are hardened and/or strengthened by any other technique. The locking solenoids 284 can be configured to be actuated to the retracted position when the vehicle is in park and actuated to the extended position when the vehicle is shifted out of park. The locking solenoids 284 also include sensors to detect whether the rods 286 of the solenoids 284 have fully extended to the extended positions to confirm to the vehicle that the steering grip 230 and spokes 232 are engaged in the first or second position.

A number of implementations have been described. Nevertheless, it will be understood that various modifications may be made without departing from the spirit and scope of the claims. Accordingly, other implementations are within the scope of the following claims.

Certain terminology is used herein for convenience only and is not to be taken as a limitation on the present claims. In the drawings, the same reference numbers are employed for designating the same elements throughout the several figures. A number of examples are provided, nevertheless, it will be understood that various modifications can be made without departing from the spirit and scope of the disclosure herein. As used in the specification, and in the appended claims, the singular forms "a," "an," and "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

What is claimed is:

1. A steering wheel assembly, the assembly comprising:
   a hub configured to be rotatably coupled to a steering column such that the hub is rotatable about a central axis of the steering column;
   a steering grip having one or more spokes; and
   a hinging mechanism coupling the one or more spokes to the hub such that the steering grip is rotatable relative to the hub about a rotational axis from a first position to a second position, wherein the rotational axis is perpendicular to the central axis of the steering column,
   wherein the hinging mechanism includes a first portion and a second portion rotatable relative to the first portion about the rotational axis, wherein the first portion is fixedly coupled to the hub and the second portion is fixedly coupled to the one or more spokes,
   wherein the hinging mechanism includes a locking mechanism actuatable between an engaged position and a disengaged position, wherein the locking mechanism prevents the steering grip from rotating relative to the hub when the locking mechanism is in the engaged position, wherein the locking mechanism includes one or more openings defined by either the first portion or the second portion, and a protrusion removably engageable with one of the one or more openings to prevent the steering grip from rotating when the locking mechanism is in the engaged position, and wherein the one or more openings include a first opening and a second opening, wherein the steering grip is in the first position when the protrusion is engaged with the first opening, and wherein the steering grip is in the second position when the protrusion is engaged with the second opening.

2. The assembly of claim 1, wherein each of the one or more openings is a v-shaped groove, and the protrusion is a v-shaped protrusion.

3. The assembly of claim 1, wherein either the first portion or the second portion of the locking mechanism that defines the one or more openings, the protrusion, or both comprise heat treated metal.

4. The assembly of claim 1, wherein the locking mechanism includes one or more locking solenoids actuatable between a retracted position and an extended position, wherein the one or more locking solenoids prevent the locking mechanism from actuating from the engaged position to the disengaged position when the one or more locking solenoids is in the extended position.

5. The assembly of claim 4, wherein the one or more locking solenoids includes a sensor for detecting whether a rod of the one or more locking solenoids has fully extended to the extended position.

6. The assembly of claim 4, further comprising a control pad having an activation button for actuating the one or more locking solenoids from the extended position to the retracted position.

7. The assembly of claim 1, further comprising a motor for moving the steering grip from the first position to the second position.

8. The assembly of claim 7, further comprising one or more positional sensors for determining a rotational position of the steering grip about the rotational axis.

9. The assembly of claim 7, wherein the hinging mechanism includes a first portion and a second portion rotatable relative to the first portion about the rotational axis, wherein the first portion is fixedly coupled to the hub and the second portion is fixedly coupled to the one or more spokes.

10. The assembly of claim 9, wherein the hinging mechanism includes a locking mechanism actuatable between an engaged position and a disengaged position, wherein the locking mechanism prevents the steering grip from rotating relative to the hub when the locking mechanism is in the engaged position.

11. The assembly of claim 10, wherein the locking mechanism includes one or more openings defined by either the first portion or the second portion, and the locking mechanism includes one or more locking solenoids actuatable between a retracted position and an extended position, wherein a rod of the one or more locking solenoids extends into a solenoid opening defined by the locking mechanism to prevent rotation of the steering grip about the rotational axis when the one or more locking solenoids are in the extended position.

12. The assembly of claim 11, wherein the one or more openings include a first opening and a second opening, wherein the steering grip is in the first position when the rod of the one or more locking solenoids is engaged with the first opening, and wherein the steering grip is in the second position when the rod of the one or more locking solenoids is engaged with the second opening.

13. A steering wheel assembly, the assembly comprising:
a hub configured to be rotatably coupled to a steering column such that the hub is rotatable about a central axis of the steering column;
a steering grip having one or more spokes; and
a hinging mechanism coupling the one or more spokes to the hub such that the steering grip is rotatable relative to the hub about a rotational axis from a first position to a second position, wherein the rotational axis is perpendicular to the central axis of the steering column,
wherein the hinging mechanism includes a first portion and a second portion rotatable relative to the first portion about the rotational axis, wherein the first portion is fixedly coupled to the hub and the second portion is fixedly coupled to the one or more spokes,
wherein the hinging mechanism includes a locking mechanism actuatable between an engaged position and a disengaged position, wherein the locking mechanism prevents the steering grip from rotating relative to the hub when the locking mechanism is in the engaged position,
wherein the locking mechanism includes one or more openings defined by either the first portion or the second portion, and a protrusion removably engageable with one of the one or more openings to prevent the steering grip from rotating when the locking mechanism is in the engaged position, and
wherein the locking mechanism includes a handlebar and the protrusion extends from the handlebar, wherein the handlebar is rotatable to actuate the locking mechanism from the engaged position to the disengaged position.

14. The assembly of claim 13, wherein the locking mechanism includes a spring configured to bias the handlebar toward the engaged position.

15. A steering wheel assembly, the assembly comprising:
a hub configured to be rotatably coupled to a steering column such that the hub is rotatable about a central axis of the steering column;
a steering grip having one or more spokes; and
a hinging mechanism coupling the one or more spokes to the hub such that the steering grip is rotatable relative to the hub about a rotational axis from a first position to a second position, wherein the rotational axis is perpendicular to the central axis of the steering column,
wherein the hinging mechanism includes a first portion and a second portion rotatable relative to the first portion about the rotational axis, wherein the first portion is fixedly coupled to the hub and the second portion is fixedly coupled to the one or more spokes, and
wherein the hinging mechanism includes at least two bumpers made of a resilient material, wherein a first of the at least two bumpers is positioned such that the second portion of the hinging mechanism abuts and compresses the first bumper when the steering grip is in the first position, and a second of the at least two bumpers is positioned such that the second portion of the hinging mechanism abuts and compresses the second bumper when the steering grip is in the second position.

* * * * *